United States Patent [19]
Pomernacki

[11] 3,792,524
[45] Feb. 19, 1974

[54] METAL CUTTING AND FINISHING TOOL

[75] Inventor: Henry Pomernacki, Northbrook, Ill.

[73] Assignee: Illinois Tool Works Inc., Chicago, Ill.

[22] Filed: Oct. 13, 1972

[21] Appl. No.: 297,514

[52] U.S. Cl.................. 29/567, 29/95 C, 29/95.1, 83/854
[51] Int. Cl............................ B26d 1/00, B26d 1/04
[58] Field of Search. 29/95.1, 95, 956, 567; 83/837, 83/850, 854

[56] References Cited
UNITED STATES PATENTS

| | | | |
|---|---|---|---|
| 2,657,720 | 11/1953 | Wolfe | 83/854 |
| 1,676,071 | 7/1928 | Bolinder | 83/854 |
| 3,537,491 | 11/1970 | Kolesh | 83/837 |
| 1,381,478 | 6/1921 | Lawrence | 29/95 C |
| 2,720,229 | 10/1955 | Drake | 29/95 C |
| 543,608 | 7/1895 | Beale | 29/95 C |

*Primary Examiner*—Harrison L. Hinson

[57] ABSTRACT

A cutting tool, such as a blade-type saw, which includes a plurality of alternately arranged roughing and finishing teeth, and which is provided with metal polishing or burnishing surfaces adjacent the terminal cutting edges of the teeth.

12 Claims, 6 Drawing Figures

PATENTED FEB 19 1974 3,792,524

METAL CUTTING AND FINISHING TOOL

BACKGROUND OF THE INVENTION

This invention relates to a saw-type cutting tool and more particularly to a cutting tool which is capable of forming a slot in a workpiece, such as metal, in such a manner as to provide a precision finish on the side surfaces of such a slot.

One problem of particular concern in certain metal cutting operations is the ability of the tool to provide a smooth precision finish on the surfaces of the workpiece which have been subjected to the cutting or metal removing action of the tool. One example of such an operation requiring attention to precision in these surfaces is the formation of seal accommodating slots in a rotary combustion engine rotor. Various machines and tools have been devised to rapidly form such slots. An example of a method and apparatus for forming slots in such a workpiece is shown and described in the copending commonly assigned application, Ser. No. 244,030, entitled "Method and Tooling for Cutting Side Seal Grooves."

The novel tool described herein will provide highly accurate slots when used in conjunction with the machine described in the above co-pending application, but is not limited to such a use and environment.

A further problem encountered in using prior art saw-type tools in operations requiring a precision finish is that the pressure exerted by the chip itself in the kerf being cut will mar or score the side surface of the slot.

The foregoing problems are essentially alleviated by the special tooth and side surface configurations provided by this invention. Roughing and finishing tooth are alternately arranged along the cutting edge of a blade-type tool. The roughing tooth is longer than the finishing tooth but has a terminal cutting edge which is narrower than the finishing tooth. In addition, flat, parallel burnishing lands are located adjacent the terminal cutting edge of the teeth. These lands are particularly designed to rub and polish the sides of the slot or kerf being cut.

The foregoing and other objects, features and advantages will be apparent from the following more particular description of the various embodiments thereof as illustrated in the accompanying drawings.

Description of the Preferred Embodiments

Figure 1:
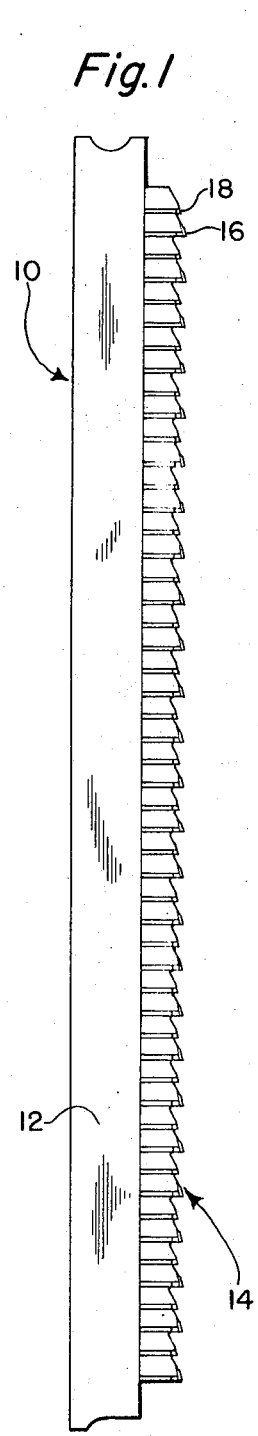
FIG. 1 is a side view of a tool including teeth designed in accordance with the present invention.

Referring now specifically to the drawings, the cutting tool of the present invention is designated generally by reference numeral 10. FIG. 1 shows one embodiment of the tool 10 as including an upper body portion 12 with appropriate blade holding means located at either end and a series of cutting teeth 14 along one longitudinal edge of the body. As is shown most clearly in FIG. 2, the cutting edge of the tool includes relatively long teeth 16 and shorter teeth 18 disposed alternately along the length thereof. The difference in the length of these two teeth is shown as distance "d."

Flat, parallel surfaces 22 and 24 are provided on finishing teeth 18 and roughing teeth 16, respectively. These surfaces serve as burnishing lands and extend upwardly a short distance from the terminal edges of the teeth and will be described in detail in the description to follow.

Figure 3:
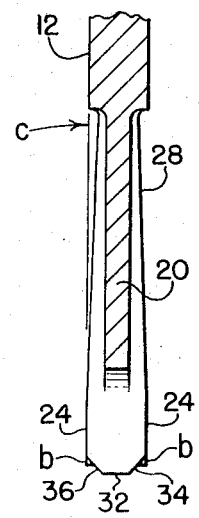
FIG. 3 is a partial vertical cross section taken along line 3—3 in FIG. 2.
Figure 2:
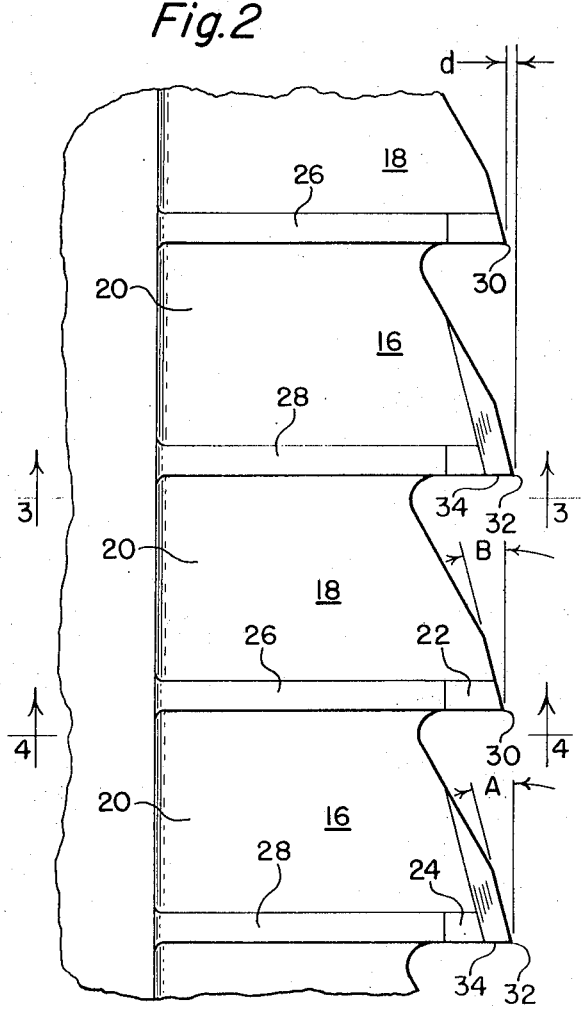
FIG. 2 is an enlarged fragmentary side view of the tool particularly showing the tooth construction and design of the invention.
Figure 4:
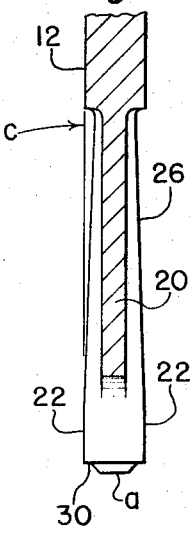
FIG. 4 is a partial vertical cross section taken along line 4—4 in FIG. 2.

The roughing teeth 16 shown in the preferred embodiment of FIGS. 2–4 include a terminal cutting edge 32 and a pair of diverging cutting edges 34 and 36. Thus, the cross section of the chip made or removed by this roughing tooth 16 will resemble the portion "a" in FIG. 4. The use of a roughing tooth with a terminal cutting edge, such as 32, which is of less width than the desired width of the kerf prevents the chip from exerting side pressures against the finished surface of a slot and marring the finish thereon.

It will be apparent from FIG. 3 that the cross section of the chip removed by the terminal cutting edge 30 on finishing teeth 18 will resemble the areas "b." Thus, the finishing tooth completes the removal of the material in the kerf to size the slot to the precise width desired. The removal of the two side corners of the chip by the finishing teeth 18 allows room for the chip material to flow inwardly and thus again prevents marring of the side surface finish.

The combination of a longer roughing tooth 16 with a shorter finishing tooth 18, alternately disposed along the cutting edge of the tool will thus allow material to be removed in a rapid and efficient manner while eliminating stress or pressure which tends to be exerted on the side surfaces of a kerf by the chip itself. In actual practice it has been found that the distance "d" which the longer tooth 16 extends below the shorter tooth 18, is most efficiently designed to be approximately 0.005 inches for use in environments described in the above mentioned copending application, Ser. No. 244,030. It should be understood, however, that for other applications or environments the distance "d" will vary in accordance with the specific conditions required for the particular workpiece and/or environment.

Relief or clearance angles "A" and "B" are provided in a somewhat conventional manner behind the terminal cutting edges of the roughing teeth 16 and finishing teeth 18. The teeth may be interconnected or joined by a web-like portion 20 of a thickness less than the desired thickness of the kerf.

Each tooth is shown to include a pair of parallel side flat surfaces, such as 22 and 24. These surfaces extend a short distance behind the plane of the cutting edges 32, 34, 36 and 30 in each of the roughing teeth 16 and 18, respectively. It should be noted that these surfaces lie in planes which are generally perpendicular to the plane which includes the terminal cutting edges. That is, they are not relieved either behind the cutting edge nor above the cutting edge. These areas, thus, provide a small surface which serves to burnish or polish the side walls of the slot being cut in the workpiece. Relief is provided above these burnishing lands 22 and 24 by the provision of inwardly tapered surfaces 28 and 26 which join the parallel surfaces 24 and 22, respectively, to the body 12 of the tool.

The tool of the present invention is particularly adapted to accurately finish the surfaces of a slot by using rapidly reciprocating strokes, the total stroke distance being relatively short, say for example equal to one or two pitches of the teeth on the tool. An accurately controlled or cam operated tool actuating device which uses the tool of the present invention will quickly cut a kerf of the desired depth while burnishing lands 22 and 24, rub the side walls of the kerf many times during the cutting operations to impart a shiny, precision finish to them.

Figure 5:
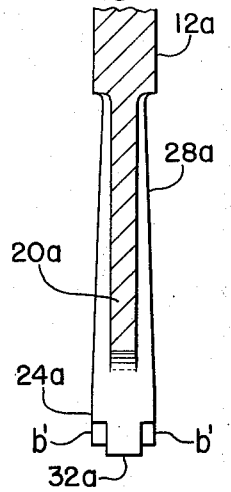
FIG. 5 is a partial vertical cross section, similar to that of FIG. 3, but of an alternate embodiment of the invention.
Figure 6:
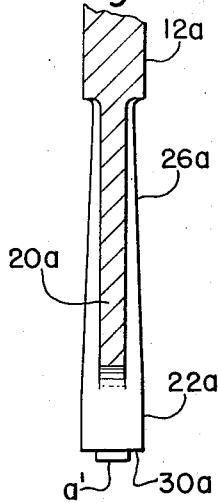
FIG. 6 is a partial vertical cross section, similar to FIG. 4, of the alternate embodiment shown in FIG. 5.

The embodiment shown in FIGS. 5 and 6 describes another configuration of a roughing tooth which will function in accordance with the teachings of this invention. The diverging terminal cutting edges are eliminated and terminal cutting edge 32a will function much in the same manner as terminal cutting edges 32, 34 and 36 in the preferred embodiment. However, the embodiment shown in FIGS. 5 and 6 provides only two cutting edges to be sharpened for each group of two teeth as opposed to the four cutting edges, namely 32, 34, 36 and 30, which must be sharpened in the preferred embodiment.

The embodiments described above are representative of a novel cutting tool which will rapidly remove material in the formation of a kerf or slot, as for example in a seal accommodating slot. In addition to the rapid material removing capabilities of this tool, it is provided with novel burnishing lands to provide the side surfaces of the kerf or slot with an accurate, polished finish. These burnishing lands, in cooperation with roughing and finishing teeth, which remove chips without exerting deleterious side pressures against the finished surfaces of the slot, make the tool particularly adaptable for use in environments and workpieces which require high quality metal removal and finishing in a single operation.

It is apparent that there has been provided, in accordance with the invention, a metal cutting and finishing tool that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. A saw blade comprising a body having a cutting portion including a plurality of teeth extending along one longitudinal edge thereof, the plurality of teeth including a series of groups, each group including a long roughing tooth and a shorter finishing tooth, at least one tooth in each group including a pair of parallel metal burnishing lands of limited surface area positioned adjacent and immediately above the cutting edges of the associated tooth, each burnishing land extending above its associated cutting edge a distance not greater than the depth of the gullet between adjacent teeth, the leading edge of the lands being a continuation of the cutting edges of the associated teeth, the lands being parallel to the plane of the blade to provide substantially unrelieved areas for burnishing the sides of the slot produced in the workpiece directly above the bottom surface of the slot formed.

2. A saw blade in accordance with claim 1, wherein the terminal cutting edge of the longer tooth is of less width than the terminal cutting edge of the shorter tooth.

3. A saw blade in accordance with claim 1, wherein the terminal cutting edge of the finishing tooth extends generally perpendicularly to the finishing lands.

4. A saw blade in accordance with claim 1, wherein the roughing and finishing teeth are relieved above the finishing lands.

5. A saw blade in accordance with claim 1, wherein the cutting edge portion of the roughing tooth includes a terminal cutting edge and a pair of side cutting edges extending upwardly and outwardly of the terminal cutting edge to intersect with the parallel finishing lands.

6. A metal cutting saw blade including a longitudinal body having teeth arranged along one edge thereof, the teeth including a plurality of long teeth and a plurality of short teeth arranged alternately along the edge, the long teeth including a terminal cutting edge of less width than the width of the terminal cutting edge of the short teeth, each tooth including generally parallel side burnishing surfaces adjacent to the terminal cutting edges of each tooth and extending above the terminal cutting edges for a limited extent not exceeding the depth of the gullet between adjacent teeth, the teeth being relieved above the side burnishing surfaces and behind the terminal cutting edges.

7. A saw blade in accordance with claim 6, wherein diverging side cutting edges are positioned between the parallel surfaces and the terminal cutting edge of the long tooth thus providing the roughing tooth with three cutting edges.

8. A metal removing and finishing tool having a blade-like body with cutting teeth and gullets between adjacent teeth disposed along one edge thereof and including alternately arranged teeth with terminal cutting edges of differing width, substantially parallel unrelieved lands located adjacent and adjoining the terminal cutting edges of the teeth and extending upwardly therefrom a limited distance, not generally exceeding the gullet depth, said lands also being substantially parallel to the plane of the blade body, whereby the alternately arranged teeth provide a roughing and finishing cut during each stroke of the tool while the lands burnish the side walls of the slot formed in the workpiece.

9. A metal removing and finishing tool in accordance with claim 3, wherein the alternately arranged teeth include a long tooth and short tooth, the long tooth having a narrower terminal cutting edge than the short tooth.

10. A metal removing and finishing tool in accordance with claim 8, wherein the parallel lands are provided on each tooth.

11. A metal removing and finishing tool in accordance with claim 8, wherein the thickness of the tooth defined at the parallel land portions corresponds generally to the desired width of the slot to be formed by the saw whereby the lands burnish the walls of the slot during operative movement of the tool in forming the slot.

12. A metal cutting and burnishing saw of the elongate blade type having a plurality of teeth along its cutting edge, the plurality of teeth including a plurality of pairs of teeth, each pair including terminal cutting edges and substantially flat, parallel unrelieved burnishing surfaces of limited surface area located adjacent to and directly above the terminal cutting edges, the leading edge of the unrelieved surfaces intersecting with the terminal cutting edge, the parallel surfaces being confined to the area above the terminal cutting edges adjacent the tooth face and within the gullet of the tooth, the parallel surfaces defining the width of the finished slot formed by the terminal cutting edges in the workpiece and providing means to burnish the sides of the slot directly adjacent the bottom of the slot formed by the terminal cutting edges during operative movement of the saw during formation of the slot.

* * * * *